United States Patent [19]

Ohtsuka

[11] Patent Number: 4,908,462
[45] Date of Patent: Mar. 13, 1990

[54] COBALT RECOVERY METHOD

[75] Inventor: Nobuo Ohtsuka, Suita, Japan

[73] Assignee: Starloy Industrial Co., Ltd., Osaka, Japan

[21] Appl. No.: 346,332

[22] Filed: May 1, 1989

[30] Foreign Application Priority Data

Jan. 22, 1985 [JP] Japan ................................ 60-010673

[51] Int. Cl.$^4$ .............................................. C07F 15/06
[52] U.S. Cl. ..................................... 556/147; 556/149
[58] Field of Search ............................... 556/149, 147

[56] References Cited

U.S. PATENT DOCUMENTS

| | | | |
|---|---|---|---|
| 3,557,173 | 1/1971 | Trevillyan | 556/147 X |
| 3,803,191 | 4/1974 | Ehrreich et al. | 556/147 X |
| 3,840,469 | 10/1974 | Hobbs, Jr. et al. | 556/147 X |
| 3,987,145 | 10/1976 | Bruns et al. | 556/24 X |
| 4,196,076 | 4/1980 | Fujimoto et al. | 556/19 X |
| 4,228,091 | 10/1980 | Partenheimer | 556/147 X |
| 4,488,999 | 12/1984 | Feld | 556/147 X |
| 4,490,297 | 12/1984 | Feld et al. | 556/147 R |
| 4,490,298 | 12/1984 | Feld | 556/147 X |

Primary Examiner—Paul F. Shaver
Attorney, Agent, or Firm—Armstrong, Nikaido, Marmelstein, Kubovcik & Murray

[57] ABSTRACT

A cobalt recovery method wherein cobalt ions are selectively shifted into an extraction agent mainly composed of either 2-ethyl hexylphosphonate mono-2-ethyl hexylester or di-2 ethyl hexylphosphate in order to extract and separate the cobalt from a solution containing cobalt salts. The method further has a step of stripping the cobalt into an aqueous solution of oxalic acid by bringing the extraction agent containing the cobalt into contact with the aqueous solution of oxalic acid after separation from nickel ion, sodium salt, calcium salt, etc. Cobalt oxalate which does not contain any other salt is then recovered.

8 Claims, 4 Drawing Sheets

COBALT RECOVERY METHOD

This application is a continuation of application Ser. No. 273,683, filed Nov. 21, 1988, now abandoned, which is a continuation of application Ser. No. 821,182, filed Jan. 22, 1986, now abandoned.

BACKGROUND OF THE INVENTION

(1) Field of the Invention

This invention relates to a method for recovering cobalt compounds wherein (a) cobalt is transferred selectively into an organic extraction agent, out of solutions containing nickel and cobalt, and (b) the cobalt is then stripped into other aqueous solutions. More particularly the invention relates to a method for easily obtaining crystalline cobalt compounds, having good filtration properties, and which does not contain sodium or calcium as impurities, through the use of oxalic acid solution as a stripping agent.

(2) Prior Art

The area of material related technology has recently shown remarkable progress. In view of this rare metals, in powder form, are now extensively used in applications ranging from manufacturing articles for daily use, to producing high technology products. Such metals are also drawing much attention as valuable materials, indispensable for the development of new materials, and for the improvement of equipment performance.

The demand for cobalt in powder form is particularly strong and it is believed that it will grow further in the coming years. Nevertheless, Japan has scare recources of cobalt and almost all cobalt requirements must be covered by importation.

On the other hand, scraps containing cobalt are increasingly generated and it is an important task to insure a secured supply of cobalt resources, and to recover cobalt in powder form from super-hardened alloy, or stellite, or catalyst wastes.

The recovery of cobalt from such wastes has been achieved through the acid leaching of scraps and the separation and purification from the obtained decoction. However, nickel is often contained in the scraps along with cobalt and it is very difficult to separate the two components in order to recover cobalt. This is because both nickel and cobalt are similar in chemical properties.

Recently, however, an extraction agent has been developed that can extract and separate cobalt selectively from a solution containing cobalt and nickel, and a complete separation can be achieved without difficulty.

Various kinds of methods have been developed for such an extraction agent. All of these methods are for the separation of cobalt and nickel. Also, in most cases in the recovery of cobalt from the extraction agent, inorganic acids such as HCL, $H_2SO_4$, $HNO_3$, etc are used.

In the case of stripping with such inorganic acid, cobalt is released in the form of salts like $CoCl_2$ or $CoSO_4$. According to the conventional recovery method, alkali is added to the solution containing cobalt and the recovery is made in the form of the precipitant of cobalt hydroxide or cobalt carbonate.

The drawback of the conventional method is the formation of large amounts of salts such as NaCl, $Na_2SO_4$, $CaCl_2$, etc. Also, a great deal of pure water is needed to wash cobalt hydroxide or cobalt carbonate if a suitable material for a powder form product is to be obtained (600 liters of pure water is needed per kg of cobalt). Furthermore, it is extremely difficult, even with use of a large volume of pure water, to remove the salts completely.

Consequently, at the oxidation or reduction step in order to produce the cobalt in powder form, the remaining salts are decomposed and gas is generated, causing corrosion of the furnace. This is another problem faced by the conventional method. Hence, no effective method has yet been established to recover cobalt in powder form for commercial production.

SUMMARY OF THE INVENTION

An object of this invention is therefore to offer an effective recovery method for cobalt, in view of the foregoing state of art, from solutions containing cobalt and nickel.

In order to accomplish the foregoing object, a cobalt recovery method according to this invention is characterized by the step of selectively shifting cobalt ions into an extraction agent, which is mainly composed of either 2-ethyl hexylphosfonate mono-2-ethyl hexylester, or di-2 ethyl hexylphosphate, in order to extract and separate cobalt from a solution containing cobalt salts. This if followed by the step of stripping the cobalt into an aqueous solution of oxalic acid by bringing the extraction agent containing cobalt into contact with the aqueous solution of oxalic acid after separation from nickel ion, sodium salt, calcium salt, etc. There is then a final step of recovering cobalt oxalate which does not contain other salts.

By the foregoing method, cobalt can be recovered, from a solution containing it, in the form of cobalt oxalate with high purity.

DESCRIPTION OF THE PREFERRED EMBODIMENT

Figure 1:
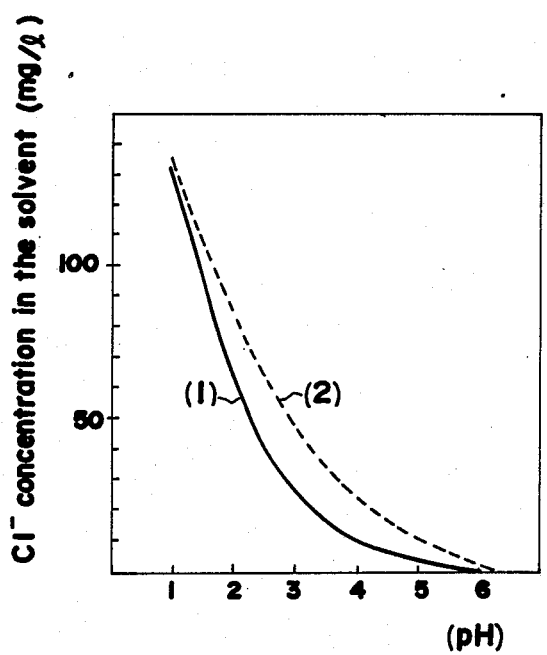
FIG. 1 is a graph which shows the relation between pH and $Cl^-$ concentrations in the solvent.

Detailed description of this invention is now given below including some of the preferred embodiments.

In this invention, 2-ethyl hexyl phosphonate mono-2-ethyl hexylester, or di-2-ethyl hexyl phosphate is used as the extraction agent for the cobalt from the solution containing the cobalt. This agent is diluted, for example, with kerosene and is preferably added with octyl alcohol by 2–5%. With this mixture as the organic solvent, the contact between the aqueous phase and organic phase is conducted in a counter current multi-stage system. The pH of each step is preferably kept at 4.5–5.0 in order to prevent the acid from moving into the organic phase and to allow only the cobalt ion to move into the organic phase. This invention was completed by finding out the above facts.

For the stripping of the cobalt from the above organic phase, oxalic acid solution is used as the releasing agent and the contact between the aqueous phase and organic phase is carried out in a multi-stage system. In this way, cobalt forms crystalline cobalt oxalate. However, the crystals are fine and small in shape and light in weight. Hence, the phase separability becomes very poor.

However, if octyl alcohol is added by 2-5 volume % and the concentration of cobalt oxalate is kept below 10 g/liter, the prompt transfer into the aqueous phase is successfully achieved.

Instead of the above octyl alcohol, it is also possible to use isodecanol. In this case, too, the preferable addition amoun is 2-5 volume %.

The cobalt oxalate recovered by this method does not contain other salts. Hence, water rinsing is hardly needed. As another advantage, dewatering and drying operations are easy because of its crystalline form.

Furthermore, in many cases, when cobalt in powder form is to be obtained out of the recovered cobalt oxalate, fine particles of cobalt oxide are obtainable through roasting at 300°-350° C. (in the case of the hydroxide compound by the conventional method, a temperature of 900°-1,000° C. was used). If metallic cobalt powder is to be produced, fine particles can be obtained through the direct reduction of cobalt oxalate. This is another merit of this invention.

For example, the oxide compound obtained through the roasting of cobalt hydroxide is either in granular or lump form, and it must be crushed to produce the powder form. On the other hand, the oxide compound or metallic powder to be obtained from cobalt oxalate is usually fine powder of below 2 microns (average particle size).

A more concrete explanation of this inventon is given below.

The original liquid to be treated in this invention is wet type refining liquid of ores containing cobalt and nickel, or acidic liquid containing cobalt obtained through the recovery treatment of valuable metals from waste catalysts, metal scraps, etc. The leaching solution obtained from the above ores, waste catalyst or metal scrap often contains other metal salts such as iron, chrome, copper, etc. in addition to cobalt and nickel.

If such an original solution is to be handled by this invention, metal salts like iron, chrome, copper, etc. must be removed in advance from the solution through such operations as filtration, ion exchange, etc. The original solution after removal of other metals as impurities is contacted with the organic solvent containing the extraction agent via the counter current multi-stage system.

As the extraction agent, cation exchange type agents such as 2-ethyl hexylphosphonate mono-2-ethyl hexylester, or di-2 ethyl hexylphosphnate, are used. When in contact with the solution containing cobalt and nickel or cobalt alone, this agent shows outstanding performance so that only Co++ as the cation is selectively extracted, while the transfer of anions (SO4$^{--}$, Cl$^-$, NO3$^-$) is kept low.

The extraction agents used in this invention i.e., 2-ethyl hexylphosphonate mono-2-ethylester, and di-2 ethyl hexylphosphonate, are shown in Formulae (1) and (2) respectively.

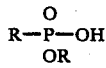
(1)

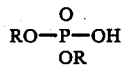
(2)

(In the above structural formulae, R means 2 ethyl hexyl group or 3,5,5-trimethyl hexyl group or isodecyl group.)

In this invention, the above described extraction agent is diluted with a non-activated solvent such as kerosene, preferably to 5-20 volume %, and adjusted to the specified concentration to be used as the organic solvent. This solvent is brought in contact, in a multistage way, with the solution containing cobalt and nickel, or with the solution containing cobalt alone. In this way, cobalt is selectively extracted into the above organic solvent.

The extraction is to be conducted preferably at pH 4.5-5.0. If the pH is below 4.5 during the extraction step the extraction of acid into the organic solvent is promoted. On the other hand, if the pH is above 5.0, nickel is extracted and the viscosity of the organic solvent is unfavorably enhanced.

Formula (3) shows the extraction reaction, with cobalt, of 2-ethyl hexylphosphonate mono-2-ethyl hexylester, which is the extraction agent in this extraction system. Formula (4) indicates the extraction reaction, with cobalt, of di-2 ethyl hexylphosphate.

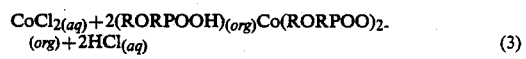

Where, R in the Formula shows 2 ethyl hexyl group, or 3,3,5 trimethyl hexyl group, or isodexyl group. Org means the organic phase containing the extraction agent. Aq indicates the aqueous phase containing cobalt or nickel.

As shown in the extraction reaction formula of the above (3) and (4), only cobalt is transferred to the organic phase containing the extraction agent. Anions such as Cl$^-$ or SO4$^{--}$ remain in the aqueous phase together with nickel and sodium salt. In this way, the impurities to be removed when cobalt in powder form is obtained, i.e., nickel, Cl$^-$, SO4$^{--}$, NaCl, Na2SO4, etc. can be separated from cobalt at the extraction process under the proper conditions.

Figure 2:
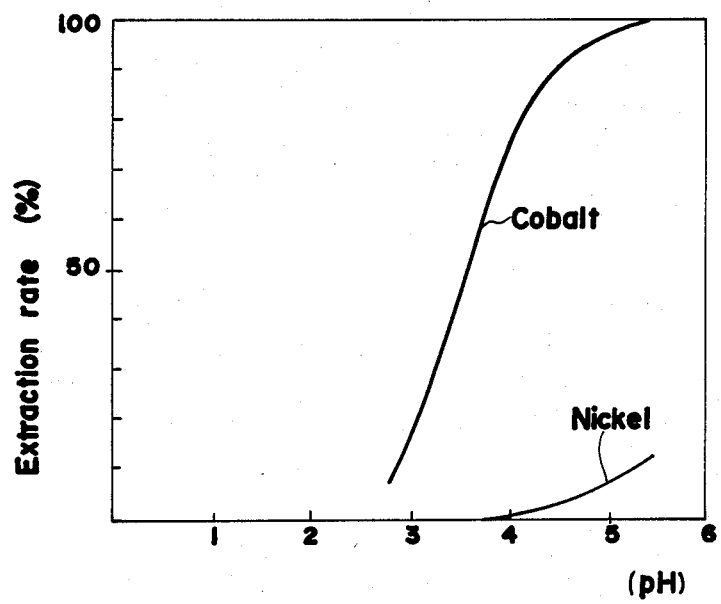
FIG. 2 and FIG. 3 are graphs showing the relaions between pH and the extraction rate.
Figure 3:
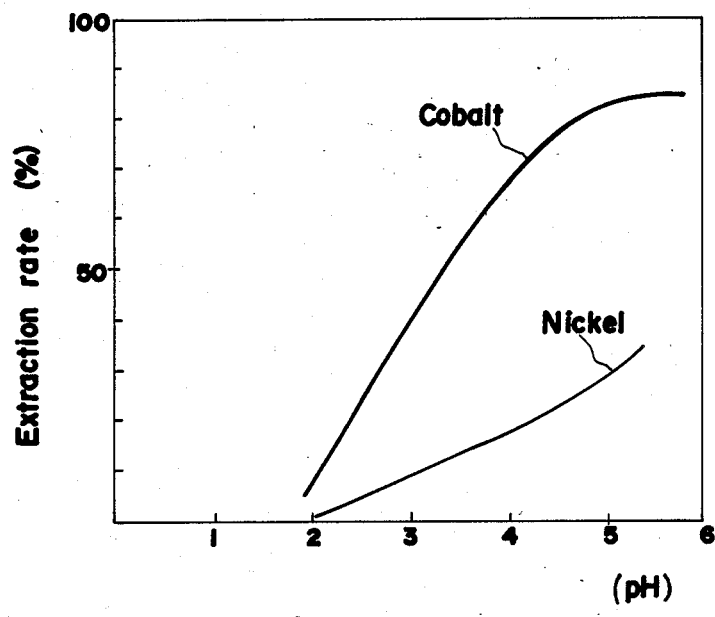

The conditions in the above extraction operation are explained with a more concrete way in reference to FIG. 1, FIG. 2 and FIG. 3.

FIG. 1 shows the curves indicating the relation between the pH value at the extraction time and the Cl$^-$ amount to be transferred into the extraction agent. Curve (1) in FIG. 1 represents the case with 2-ethyl hexylphosphonate mono-2-ethyl hexylester, while curve (2) shows the case with di-2 ethyl hexylphosphate. These extraction agents were diluted with kerosene to 20 volume %.

In order to prevent anions such as Cl$^-$ from transferring into the organic solvent, extraction at pH 6.0 or higher is preferable, as shown in FIG. 1. However, as pH value is enhanced, the viscosity of the solvent is increased and troubles were encountered such as, poor phase separation between the organic phase and aqueous phase. In this connection, a pH range of 4.5-5.0 is proper in order to keep the viscosity low at the time of extraction.

FIG. 2 shows the extraction rates of cobalt and nickel in such a case, where the kerosene solution containing 20 volume % of the extraction agent, i.e. 2-ethyl hexylphosphonate mono-2-ethyl hexylester, is used as the organic solvent and is brought into contact with a solution containing 10 g/l each of cobalt and nickel. The conditions at the extraction time are as follows: The volume ratio of the organic phase to aqueous phase is 1:1. The temperature of the solution is 45° C. The mixing time is 30 minutes.

As shown in FIG. 2, the separating property of cobalt and nickel is very good when the extraction is carried out with the solvent containing this extraction agent. In contact with a solutio containing 10 g/l of cobalt and 2 g/l of nickel, the nickel content in the cobalt could be kept as low as 0.04% under when the pH range was maintained at pH 4.5-5.0. The concentration of cobalt which remained in the aqueous phase was 0.001 g/l. Hence, nickeL separated in the aqueous phase can be recovered as nickel, with high purity, via the neutralization process with alkali and the water washing process.

FIG. 3 shows the extraction rates of cobalt and nickel in a case, where the kerosene solution containing 20 volume % of the extraction agent, i.e., di-2 ethyl hexylphosphate, is used as the organic solvent and is brought into contact with a solution containing 10 g/l each of cobalt and nickel.

As shown in FIG. 2, the separation property of cobalt and nickel is not good when the extraction is carried out with the solvent containing this extraction agent. However, this system can be applied to scrap containing no nickel, such as the treatment of cemented carbide, etc.

Adjustment of pH in such an extraction operation can be made through the advance addition of alkali to the extraction agent. Alkali can also be added at the time of the contact mixing. This extraction operation can be carried out in accordance with normal solvent extraction procedures for liquid-liquid extraction.

As the next step in this invention, the organic solvent, in which cobalt is extracted, is brought into contact with the aqueous solution containing oxalic acid. Thereby, cobalt is subjected to stripping from the above organic solvent, into the aqueous phase, in the form of cobalt oxalate.

The oxalic acid solution to be used then can be obtained by dissolving the oxalic acid sold at the market into purified water. However, in order to avoid the mixing of impurities such as dirts, it is preferred to use the filtered liquid after the dissolution.

Formula (5) shows the extraction formula of this stripping in the case of the extraction agent of 2-ethyl hexylphosphate mono-2-ethyl hexylester.

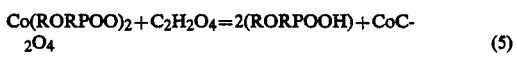

$$Co(RORPOO)_2 + C_2H_2O_4 = 2(RORPOOH) + CoC_2O_4 \quad (5)$$

As shown in FIG. 2, the reaction formula of the above (5) is shifted to the right when pH value is below 2.5 Hence, it is desirable to keep the concentration of oxalic acid in the stripping process as about 1.5-1.8 times high as that of cobalt to be released into the aqueous phase.

The cobalt oxalate to be obtained through the above described reaction formula, of the above (5), has the form of fine particle sediments, and builds, in some cases, a third phase in addition to the organic phase and aqueous phase, deteriorating the phase separation property. However, the phase separation property in such a case can be improved by adding octyl alcohol by 2-5%.

Meanwhile, if the cobalt concentration in the organic solvent containing the extraction agent is too high lumps of cobalt oxalate would be formed and float in the organic solvent upon contact with oxalic acid aqueous solution. The phase separation would be then deteriorate as in the above case. Consequently, it is desired to adjust the concentration of cobalt to the range of 5-10 g/l in the aqueous phase after the stripping. For this adjustment of the cobalt concentration, the extraction curve of FIG. 4 and the release curve of FIG. 5 are used.

Figure 4:
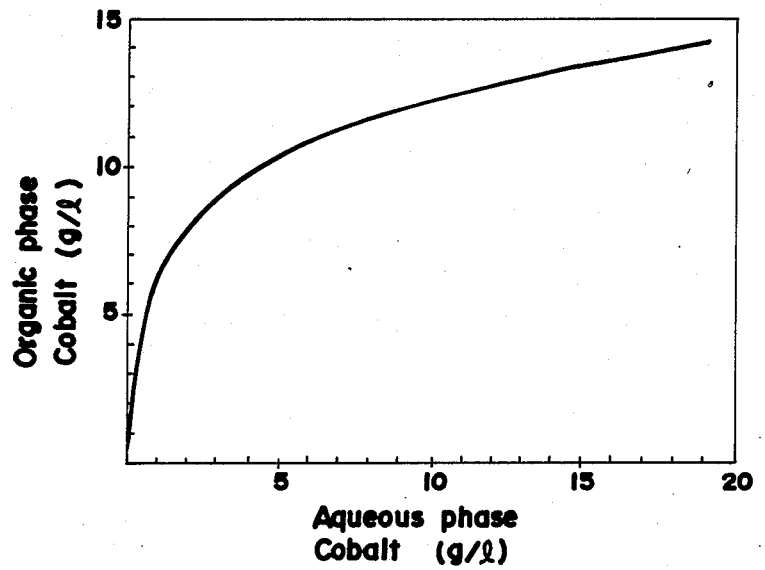
FIG. 4 shows the extraction curve.

The extraction curve of FIG. 4 shows the extraction equilibrium, when the extraction agent, 2-ethyl hexylphosphonate mono-2-ethyl hexylester is diluted with kerosene to 20 volume % to obtain the organic solvent this is then mixed with the aqueous solution containing cobalt at the ratio of 1:1, followed by the agitating contact for 30 minutes at 40° C.

If the concentration of cobalt in the aqueous solution to be supplied to the extraction process is determined, the stage number of the extraction and the cobalt concentration in the organic solvent to be supplied to the stripping process can be controlled freely by setting the ratio of organic solvent to aqueous phase in an arbitrary way in reference to FIG. 4.

Figure 5:
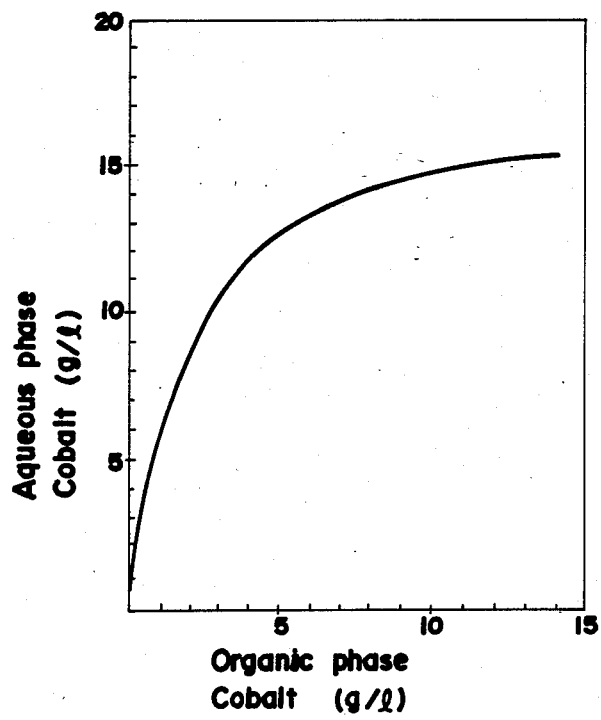
FIG. 5 indicates the release curve.

In a similar manner, the releae curve of FIG. 5 shows the release equilibrium when the above organic solvent containing the cobalt and the aqueous solution containing 25 g/l of oxalic acid are mixed at the ratio of 1:1, following agitation and contact for 30 minutes at 40° C. If the concentration of cobalt in the organic solvent discharged from the extraction process is known, the stage number of the stripping and the concentration of cobalt stripped into the aqueous phase can be controlled by setting an arbitrary ratio of organic solvent to aqueous phase.

The stripping operation is conducted by the use of the multi-stage counter current system having more than 2 stages.

During reverse extraction, at the 2nd stage, cobalt oxalate formed in the aqueous phase disturbs the phase separation during the stripping of the 1st stage. Hence the aqueous phase, after the stripping, is filtered, and then supplied for the stripping of the 1st stage. In a similar way, the aqueous phase obtained in the 3rd stage is supplied to the 2nd stage after the filtration, and so on. In this manner the stripping operation can be carried out more effectively.

Heating during the stripping operation is an effective means to improve the phase separation property. The preferable heating range is 30°-60° C., if kerosene is used as the diluting agent.

Figure 6:
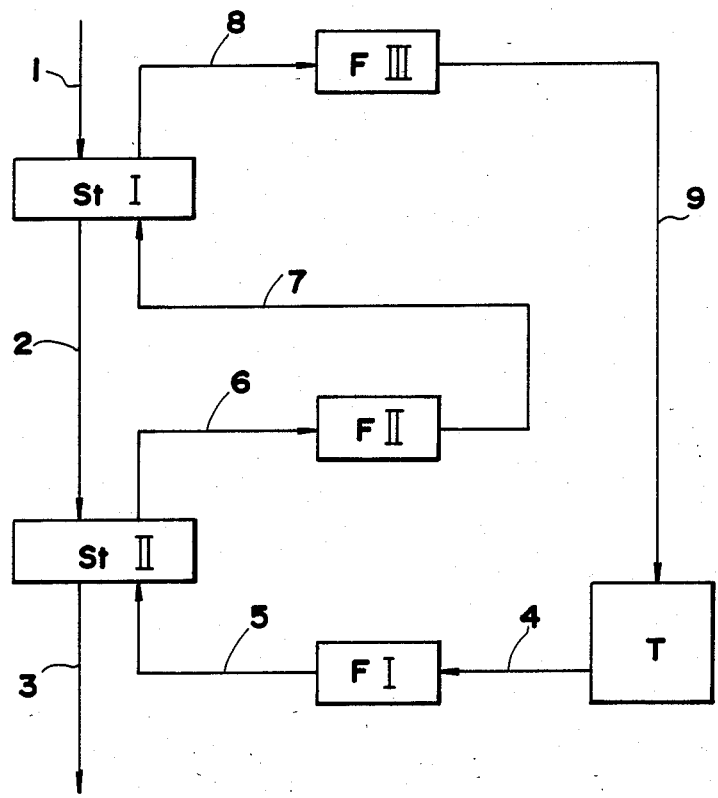
FIG. 6 represents the system diagram of the stripping step.

The steps of the above stripping operation are further explained in reference to FIG. 6.

FIG. 6, "St I" and St II" represent the stripping of the 1st stage and the 2nd stage, while "FI", "FII" and "FIII" mean the filtration process. "T" shows the oxalic acid adjustment tank.

"1" shows the supply line of the organic phase containing cobalt, after the extraction step, to the 1st stage stripping step, "2" shows the supply line of the same organic phase to the 2nd stage stripping step, "3" is the transfer line of purified organic solvent after the release of cobalt, "4" is the supply line of oxalic acid, which is dissolved into purified water, to the filtration step, "5"

is the supply line to the 2nd stage stripping step of oxalic acid aqueous solution after the filteration and purification, "6" is the supply line to the filteration step of the aqueous phase containing cobalt oxalate after the 2nd stage stripping step, "7" shows the supply line to the 1st stage stripping step of the aqueous phase after the filtration, "8" shows the supply line to the filteration step of the aqueous phase containing cobalt oxalate, after the 1st stage stripping and "9" shows the return line to the oxalic acid adjustment tank of the aqueous phase after the filteration of cobalt oxalate.

In FIG. 6, th organic solvent containing cobalt, after the extraction step, is supplied to the 1st stage stripping step "St I" via the line "1". Simultaneously, the oxalic acid aqueous solution from the filteration step "FII" is supplied to the above step St I via the line "7", so that both solutions may come into contact.

Then, cobalt forms crystals of readily soluble cobalt oxalate, which is stripped from the organic phase to the aqueous phase. This aqueous phase is sent via line "8" to the filteration step FIII. After dehydration at FIII, it is recovered as high purity cobalt oxalate.

On that occasion, the oxalic acid solution of the aqueous phase is sent to "T" via the line "9" for the purpose of circulation and utilization.

The organic solvent from the above 1st stage stripping step is transferred to the 2nd stage stripping step "St II" via the line "2". At the same time, the oxalic acid solution purified a the filteration step "F1" is injected into the above step "St II" via line "5" for purpose of making the contact between both of the solutions.

The organic solvent treated with the same above step is purified and is circulated, for use, to the extraction step via the line 3. The cobalt oxalate formed at the above step "St II" is recovered from the line "6" via the filteration step "FII".

Cobalt oxalate obtained in the above way can be used, as is, for the raw material of metal powder or oxide powder. If washed with water, however, the purity can be further enhanced. As for the pure water amount to be used, about 10 liter water per kg of cobalt is enough under normal circumstances.

Oxalic acid solution utilized for circulation in the above stripping contains around 0.05 g/l of cobalt oxalate. Since nickel as an impurity is gradually accumulated, a part of the solution is taken out of the line "9", and is treated separately.

For example, the neutralization treatment is applied and the blended sediment (hydroxides, etc.) of nickel and cobalt is recovered. After water washing, it is dissolved with the leaching liquid of the initial step and is treated via circulation.

What is claimed is:

1. A cobalt recovery method for the recovery of cobalt oxalate containing no other salts from solutions containing cobalt salts, comprising: (a) extraction with an extraction agent, mainly composed of 2-ethyl hexylphosphonate mono-2-ethyl hexylester or di-2-ethyl hexylphosphate and octyl alcohol, or isodecanol, in order to extract and separate cobalt from the solution containing the cobalt salts, so that the cobalt ion may be selectively shifted into the extraction agent and, after the separation of the cobalt from other salts including nickel ions, sodium salt, calcium salt, in the solution, (b) stripping is performed by bringing the extraction agent containing cobalt into contact with an aqueous solution of oxalic acid so that cobalt is subjected to stripping into the oxalic acid solution and (c) recovering the desired product.

2. A cobalt recovery method as claimed in claim 1, wherein pH of the solution containing the cobalt salt is adjusted to the range of 4.5~5.0 at the time of the cobalt extraction.

3. A cobalt recovery method as claimed in claim 1, wherein 2~5% volume of octyl alcohol is added to the extraction agent as the inhibitor to the emulsion formation at the stripping step of cobalt.

4. A cobalt recovery method as claimed in claim 1, wherein the filtration process is provided for each stripping sep of the aqueous solution of oxalic acid following the preceding stripping step, so that the cobalt oxalate amount in the respective stripping tank may be minimized, thus to inhibit the formation of the emulsion.

5. A cobalt recovery method as claimed in claim 2, wherein 2~5% volume of octyl alcohol is added to the extraction agent as the inhibitor to the emulsion formation at the stripping step of cobalt.

6. A cobalt recovery method as claimed in claim 2, wherein the filtration process is provided for each stripping step of the aqueous solution of oxalic acid following the preceding stripping step, so that the cobalt oxalate amount in the respective stripping tank may be minimized, thus to inhibit the formation of the emulsion.

7. A cobalt recovery method as claimed in claim 3, wherein the filtration process is provided for each stripping step of the aqueous solution of oxalic acid following the preceding stripping step, so that the cobalt oxalate amount in the respective stripping tank may be minimized, thus to inhibit the formation of the emulsion.

8. A cobalt recovery method ass claimed in claim 5, wherein the filtration process is provided for each stripping step of the aqueous solution of oxalic acid following the preceding stripping step, so that the cobalt oxalate amount in the respective stripping tank may be minimized, thus to inhibit the formation of the emulsion.

* * * * *